United States Patent [19]

Yamaguchi et al.

[11] Patent Number: 4,802,240

[45] Date of Patent: Jan. 31, 1989

[54] SYNCHRONOUS RECEIVING METHOD FOR SELECTIVE CALLING SIGNAL

[75] Inventors: Hiroyuki Yamaguchi, Hamura; Naomi Yokoyama, Fukuoka, both of Japan

[73] Assignee: Kokusai Denki Kabushiki Kaisha, Tokyo, Japan

[21] Appl. No.: 68,656

[22] Filed: Jul. 1, 1987

[30] Foreign Application Priority Data

Jul. 3, 1986 [JP] Japan ................. 61-155085

[51] Int. Cl.⁴ ................. H04B 1/16; H04Q 9/14
[52] U.S. Cl. ................. 455/343; 455/228; 340/825.44
[58] Field of Search ................. 455/343, 228, 229, 127, 455/38; 340/825.06, 825.44, 825.53, 825.48, 311.1

[56] References Cited

U.S. PATENT DOCUMENTS

| | | | |
|---|---|---|---|
| 4,353,065 | 10/1982 | Mori | 455/343 |
| 4,384,361 | 5/1983 | Masaki | 455/343 |
| 4,523,332 | 6/1985 | Mori | 340/825.44 |
| 4,554,540 | 11/1985 | Mori et al. | 340/825.44 |
| 4,652,875 | 3/1987 | Waki | 340/825.44 |
| 4,663,623 | 5/1987 | Lax et al. | 340/825.44 |
| 4,745,408 | 5/1988 | Nagata et al. | 455/343 |

Primary Examiner—Robert L. Griffin
Assistant Examiner—Curtis A. Kuntz
Attorney, Agent, or Firm—Emmanuel J. Lobato; Robert E. Burns

[57] ABSTRACT

A synchronous receiving method for a selective calling signal is disclosed, in which the selective calling signal comprises a first code of predetermined format which enables a receiving unit to easily detect that information is being sent over a channel, a second code of a predetermined format which succeeds the first code and causes the receiving unit to be synchronized with the information transmitted over the channel, and a third code which succeeds the second code and sends information to the receiving unit. In accordance with the present invention, the synchronization is established with the third code in place of the second code included in the transmitted signal to settle the problems of impaired battery saving efficiency, decreased amount of information and increased transmitting time.

2 Claims, 4 Drawing Sheets

SYNCHRONOUS RECEIVING METHOD FOR SELECTIVE CALLING SIGNAL

BACKGROUND OF THE INVENTION

The present invention relates to a synchronous receiving method employed for receiving a signal train including synchronizing signals, such as selective calling signals.

A signal transmitted from the transmitting side in a transmission system of selective calling signal compreises a first code of a predetermined format which enables a receiving unit to easily detect that information is being sent over a channel, a second code of a predetermined format which succeeds the first code and causes the receiving unit to be synchronized with the information transmitted over the channel, and a third code which succeeds the second code and sends information to the receiving unit.

The receiving unit can be synchronized with the transmitted signal by detecting again the second code of a predetermined format as a synchronizing code, as mentioned above. Conversely, where the second code is not detected once or more times in succession as predetermined, control for battery saving before establishment of synchronization is effected again by which the receiving unit performs intermittent reception. A method which involves repeated detection of the second code of synchronizing code for acquiring synchronization possesses disadvantages such as follows:

(1) The battery saving efficiency is low because it cannot be decided, until the detection of the second code of a predetermined format, whether or not information is being provided on the channel.

(2) Since a portion of information is alloted to the second code, the amount of information which can freely be used is small.

(3) Where it is desired to send a large quantity of information at a higher transmission speed than at present, the time for sending the information increases.

(4) The battery saving efficiency is low because it is necessary to supply power to the receiving section and the decoder for synchronization at the timing for sending out the second code.

SUMMARY OF THE INVENTION

An object of the present invention is to provide a synchronous receiving method for a selective calling signal capable of settling the problems of imparied battery saving efficiency, decreased amount of information and increased transmitting time.

To attain the above object of the present invention, a synchronous receiving method for a selective calling signal is proposed in which the synchronization is established with the third code in place of the second code included in the transmitted signal.

BRIEF DESCRIPTION OF THE DRAWINGS

The present invention will be described in detail below in comparison with prior art with reference to the accompanying drawings, in which:

FIG. 3 is a timing chart in case of receiving the POCSAG code according to the prior art;

FIGS. 4 and 5 are timing charts, each showing an example of receiving the POCSAG code of FIG. 1 through use of the receiving method of the present invention.

DETAILED DESCRIPTION

Figure 1:
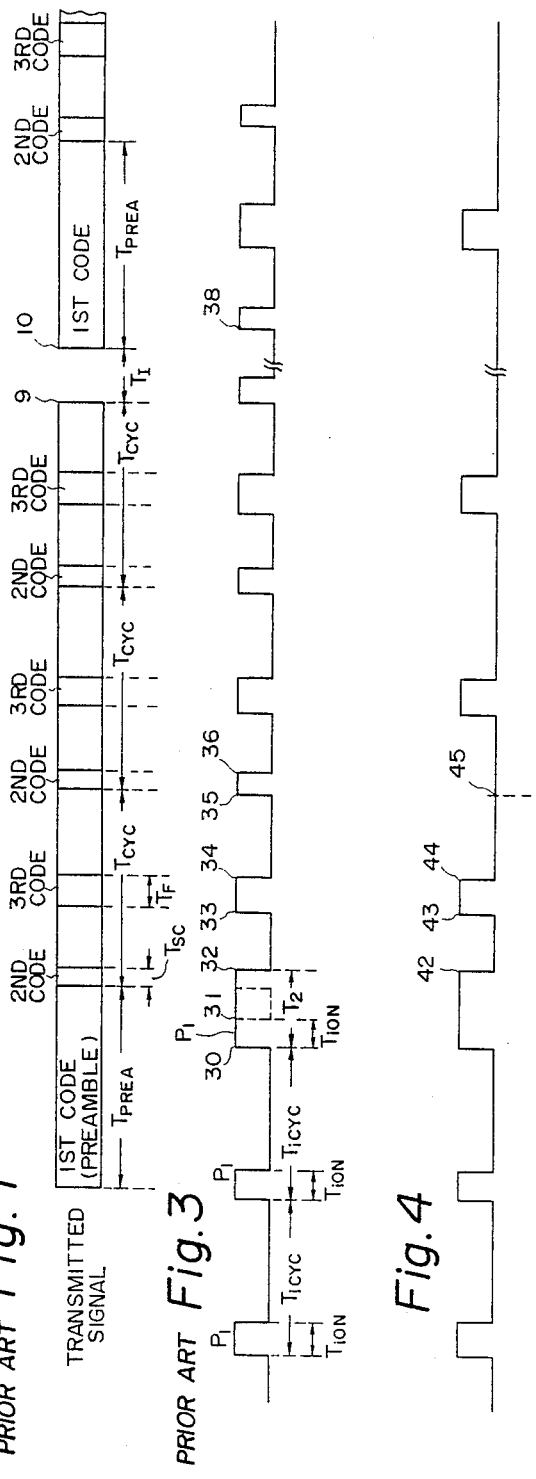
FIG. 1 shows the format for sending the POCSAG code which is one of signalling systems to which the present invention is applied.

FIG. 1 shows the format of a selective calling digital signal, to which the present invention is applied. Reference numeral 9 indicates the timing at which the transmitted signal is stopped.

Figure 2:
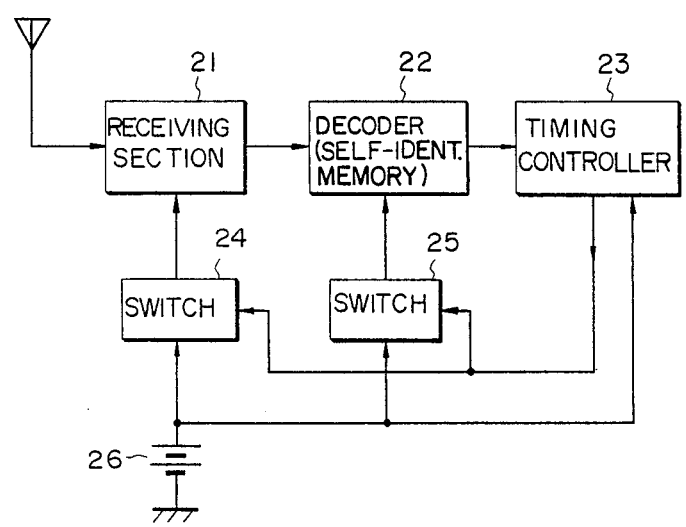
FIG. 2 is a diagram illustrating an example of the arrangement of a receiving unit which embodies the receiving method of the present invention.

On the other hand, the receiving unit for receiving the above-mentioned signal train is made up, as shown in FIG. 2, of a receiving section 21 for receiving the transmitted signal, a decoder 22 for decoding the received signal, a timing control section 23 having a timer for controlling the receiving timing, and switches 24 and 25 for turning ON and OFF the power supply to the receiving section 21 and the decoder 22 under control of the timing control section 23. The switches 24 and 25 may also be combined into a single one common to the receiving section 21 and the decoder 22.

Next, the operation of this prior art example will be described.

In the receiving unit shown in FIG. 2, the timing controller 23 intermittently closes the switches 24 and 25, by its output, to supply power to the receiving section 21 and the decoder 22, putting the receiving unit 21 in the state of waiting for the detection of the first code of a predetermined format, the detection of the succeeding second code of a predetermined format after the detection of the first code, and the detection of that one of succeeding third codes which has a predetermined format.

Form the viewpoint of synchronization, however, the second code of a predetermined format is detected again regardless of whether or not that one of the third codes which has a predetermined format has been detected.

The method of prior art described above has above-mentioned defects.

The defects of the above prior art can be effectively eliminated by the present invention.

To describe the present invention, a POCSAG (Post Office Code Standardization Advisory Group) code, which is one of worldwide standard codes, will be shown first and then an example of a method for receiving it will be described. It must be noted here that the present invention is not limited specifically to the POCSAG code but is applicable to all codes having transmission formats similar to that of the above-mentioned code.

FIG. 3 is a timing chart showing the timing for turning ON the switches 24 and 25 in the case of receiving a POCSAG code, such as the format shown in FIG. 1 according to the prior art method.

FIG. 4 is a timing chart showing the timing for turning ON the switches 24 and 25 in such a manner as not to receive second codes of second and subsequently transmitted signals for the purpose of synchronizing the receiving unit with the currently transmitted signal alone in the reception of signals of the format depicted in FIG. 1 according to the method of the present invention.

FIG. 5 is a timing chart showing the timing for turning ON the switches 24 and 25 so that the receiving unit can be synchronized with the currently transmitted signal and the next transmitted signal in the reception of signals of the format depicted in FIG. 1 according to this invention method. Table 1 shows the time length of each timing in FIGS. 1 to 5.

In the POCSAG code the predetermined first code is called preamble and the predetermined second code a synchronizing code, as shown in FIG. 1. In this specification, the third code for sending information will be called self-frame data, for convenience of description. The self-frame data exists in a frame between two synchronizing codes but its position is unfixed because it is dependent upon a subscriber number, and its length also varies with the amount of information being added. However, since the receiver can detect the selfframe addressed thereto, by means of an ID-ROM (self-identification read only memory) provided in the decoder 22, the receiver is capable of receiving the self-frame data no matter where it may lie in the above-noted frame. The number of transmissions of data identified by $T_{CYC}$ in FIG. 1 is dependent upon the amount of information to be called; namely, when the amount of information to be called is large, the data is sent many times in succession, and when the amount of information is small, a series of data beginning with a new preamble is sent after an irregular time interval $T_I$.

TABLE 1

| Symbol | Time Length of Each Timing | |
|---|---|---|
| | Time | Time Length (second) |
| $T_{PREA}$ | Preamble sending time | 1.125 |
| $T_{CYC}$ | Repetition time | 1.0625 |
| $T_{SC}$ | Synchronizing code sending time | 0.0625 |
| $T_F$ | Self-frame sending time | 0.125 or more |
| $T_I$ | Interval | Unfixed |
| $T_{iON}$ | Idle mode Preamble acquisition time | $0 < T_{iON} \leq T_{PREA}$ |
| $T_{iCYC}$ | Idle mode Reception rise time | $0 < T_{iCYC} \leq T_{PREA}$ |
| $T_1$ | Preamble acquisition time | $0 < T_1 < T_{SC}$ |
| $T_2$ | First synchronizing code acquisition time | $0 < T_2 \leq T_{PREA} + T_{SC}$ |

Now, in Table 1, the preamble sending time $T_{PREA}$, the repetition time $T_{CYC}$, the synchronizing code sending time $T_{SC}$, and the self-frame sending time $T_F$ are defined in the POCSAG code in case of signal transmission speed of 512 bps. The interval time $T_I$ changes with the tranffic density of the channel. On the other hand, the preamble acquisition time $T_1$ and the synchronizing code acquisition time $T_2$ on the receiving side vary according to the arrangement of the receiver, and hence they are not specified here. However, since their principal objects are to acquire the preamble and to acquire the synchronizing code succeeding the preamble, it is common sense to select these times within the ranges shown in Table 1.

Next, the operation will be described with reference to the drawings. FIG. 3 is also a timing chart for reception by the conventional method. Now, let the receiving mode of operation until the acquisition of the first synchronizing code (the second code) be called an idle mode. In this mode, the receiver performs the receiving operation for a duration of time $T_{iON}$ at a period $T_{iCYC}$ on the basis of turn-ON control of the switches 24 and 25 by the timing controller 23 depicted in FIG. 2. In other words, the receiver performs an intermittent operation intended for battery saving. The switches 24 and 25 operate at the same timing and hence will hereinafter be described as a single switch. The purpose of battery saving in the idle mode is to acquire the preamble within the shortest rise time (the operating time) of the receiver so as to lengthen the service life of the battery. To this end, the times $T_{iON}$ and $T_{iCYC}$ are each included at least once in the preamble acquisition time $T_{PREA}$, but this changes according to the arrangement of the receiver; therefore, their time lengths are not specified in this specification.

When the receiver is caused to rise at timing 30 in FIG. 3, if no preamble has been provided on the channel, the reception will be interrupted at timing 31 after the lapse of time $T_{iON}$. In FIG. 3, however, since the receiver rises at the timing that allows the acquisition of the preamble, its receiving operation time is extended to $T_2$ at timing 31, and the receiver acquires the first synchronizing code (the second code) at timing 32. At this time the receiver can establish synchronization with the channel and thereafter enters the synchronous receiving operation. When the synchronizing code could have thus been acquired at the timing 32, the timer provided in the timing controller 23 in FIG. 2 is reset, interrupting the power supply to the receiving section 21 and the decoder 22 in FIG. 2 until the timing 33 just preceding the self-frame data (the third code). When the timing 33 is reached, the power supply to the receiving section 21 and decoder 22 is turned ON by the switching operation of the switches 24 and 25, permitting the reception of the self-frame data and accompanying necessary data until timing 34. Following this, the receiver enters and remains in the battery saving mode until the next synchronizing code reception. When timing 35 in FIG. 3 is reached, the power supply to the receiving section 21 and the decoder 22 is turned ON by the switching operation of the switches 24 and 25 for acquiring the synchronizing code necessary for maintianing the receiver in the synchronous receiving state and then the power supply is turned OFF at timing 36 by the switching operation of the switches 24 and 25.

In this way, once the receiver is synchronized with the channel at the timing 32, it will thereafter repeat the synchronous receiving state. Even if a series of data starting with a new preamble is sent at timing 10, the receiver cannot receive them because at timing 38 for the reception of the synchronizing signal in the duration of the preamble the receiver still remains in the synchronous receiving state and only waits for the acquisition of the synchronizing code. As described above, the reception according to the prior art method encounter the problems that the second and subsequent synchronizing codes (second codes) must be received repeatedly for maintaining the synchronous receiving state and that a new series of data sent after the unfixed interval $T_I$ cannot be received.

Next, description will be given of the reception according to the present invention with reference to FIGS. 4 and 5.

The operation in FIG. 4 is identical with the operation in FIG. 3 until timing 42 for receiving the first synchronizing code so as to enter the synchronous receiving mode and timing 43 and 44 for receiving the self-frame data. At timing 45, however, there is not carried out the operation of acquiring the synchronizing code for maintaining the synchronous receiving state as in the prior art. This is one of the most outstanding features of the present invention. That is, it is decided whether the receiver is in the synchronized state or not, on the basis of the regularity of the self-frame data acquired at the timing 43 and 44. This makes unnecessary the operation of receiving the second and subsequent synchronizing codes, producing the battery saving effect sufficiently. With this method, however, the preamble cannot be acquired at the timing 38 as is the case with the conventional method (FIG. 3); namely, the new series of data starting at the timing 10 cannot be acquired.

Figure 6:
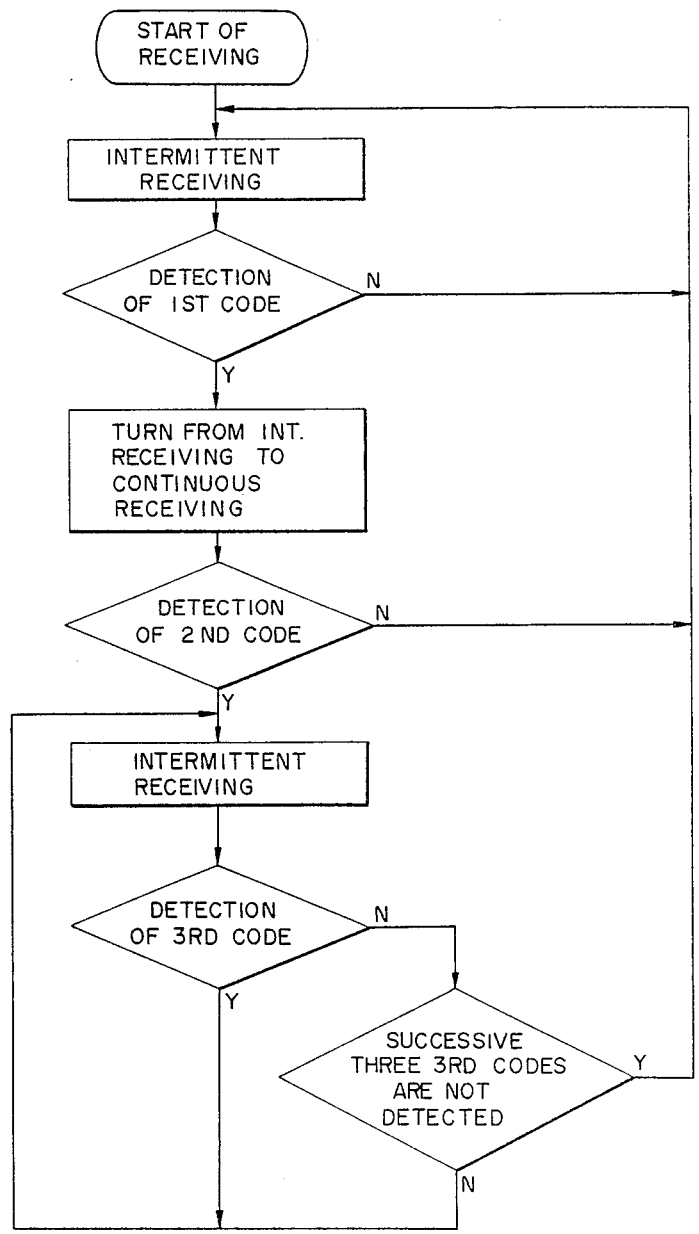
FIGS. 6 and 7 are flow-charts explanatory of the operation of the present invention.

FIG. 6 is a flow chart illustrating operations corresponding to FIG. 4.

The example depicted in FIG. 5 permits the acquisition of the new series of data starting at the timing 10 because the preamble is acquired at timing 56 though this will somewhat decreases the battery saving efficiency as compared with that in the example of FIG. 4. The operation in this example is identical with those in FIGS. 3 and 4 until timing 52 for receiving the first synchronizing code for entering the synchronous receiving mode and timing 53 and 54 for receiving the self-frame data. The most striking feature of the example shown in FIG. 5 is the timing 55. The purpose of receiving the synchronizing code at the timing 55 at the sacrifice of the battery saving efficiency resides in the acquisition of the preamble, not the synchronizing code. Therefore, the ON time $T_1$ of the receiving section 21 and the decoder 22 is selected to be the shortest but long enough to acquire the preamble. This time length varies according to the receiver used, and hence is not specified here. According to this method, the synchronous receiving state is maintained starting at the timing 56, but at the timing 56 the time $T_2$ is extended nearly to its maximum to acquire the preamble, by which the synchronous receiving state is obtained again, permitting the acquisition of the new series of data starting at the timing 10.

Figure 7:
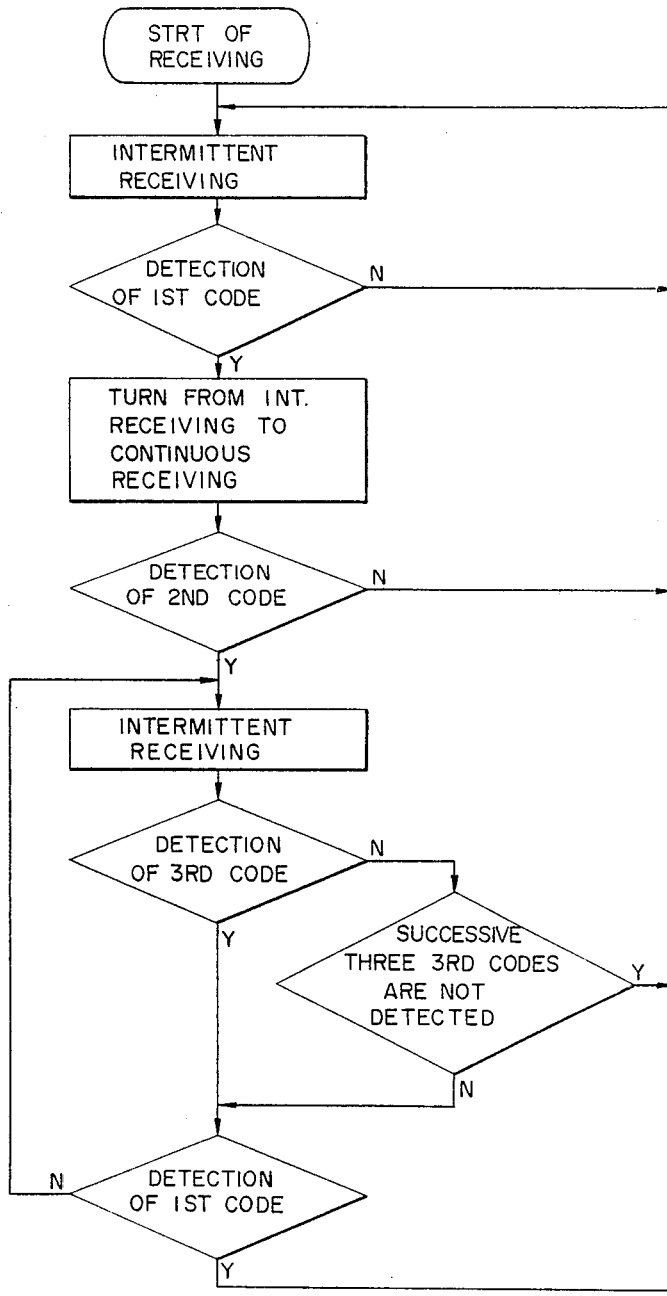

FIG. 7 is a flow-chart illustrating operations corresponding to FIG. 5.

FIG. 2 illustrates the arrangement of the receiving unit 21 capable of the above-noted reception as referred to previously, but its operation will be supplemented. The received data from an antenna is demodulated by the receiving section 21 and then provided to the decoder 22. The decoder 22 decides and detects the preamble, the synchronizing code, and the self-frame data from the demodulated data. The detected results are applied to the timing controller 23 and the timer values of a timer circuit provided in the timing controller 23 are set to predetermined values. With the output of this timer the timing controller 23 opens and closes the switches 24 and 25 to supply power to the receiving section and the decoder, performing the receiving operation.

The operations of the timing controller 23 can be summarized as follows:

(1) Until informed of the detection of the first code (the preamble) from the decoder 22, the timing controller 23 provides switching pulses $P_1$ by which the power supply of the receiving section 21 and the decoder 22 (i.e. the switches 24 and 25) are caused to operate intermittently for the time $T_{iON}$ with the period $T_{iCYC}$.

(2) When the detection of the first code is informed, a $P_1$ pulse generator is reset and at the same time the timer in the timing controller 23 is started to hold the switches 24 and 25 in the ON state for the time $T_2$ at maximum until the reception of the second code.

(3) When the detection of the second code is informed, a timer for receiving the second code is reset, pulses for turning ON the switches 24 and 25 for receiving the second code of the fixed period $T_{CYC}$ are generated for the time $T_1$ (only in the case of FIG. 5), and pulses for turning ON the switches 24 and 25 for receiving the third code are produced intermediate between two second codes at intervals which are determined by an ID-ROM in the decoder.

The present invention can be expected to produce the following effects:

(1) Since there is no need of providing synchronization with the predetermined second code, the time for power supply decreases, improving the battery saving efficiency.

(2) Since any portion of information is not occupied by the second code, the amount of information does not decrease.

(3) Since the second code need not repeatedly sent as the synchronizing code, a large amount of data can be sent.

What we claim is:

1. A synchronous receiving method for a selective calling signal, which detects by a receiving unit first, second and third codes of a received information signal of a predetermined code format, and for enhancing the battery saving efficiency of the receiving unit, comprising the steps of: intermittently operating the receiving unit for a fixed short period of time at regular time interval by turning ON and OFF power supply to the receiving unit under control of a timing control circuit in the receiving unit, before the detection of the first code for indicating that information is being sent on a channel;

continuing the operating of the receiving unit for a fixed period of time, during which a just preceding one of the second codes is detected as a synchronizing code, after the detection of the first code;

intermittently receiving and detecting by the receiving unit third codes of information, the position of which is determined by a selective calling number sent between adjacent two of the second codes and assigned to the receiving unit, at intervals determined by a self-identification memory in the receiving unit, without causing the receiving unit to receive and detect the second codes which are sent after the just preceding one of the second codes at regular intervals in the time interval between the detection of the just preceding one of the second codes and the detection of a next one of the first codes and utilizing the third codes for deciding whether the receiving unit is synchronized with the transmitted signal of the channel.

2. A synchronous receiving method for a selective calling signal, which detects by a receiving unit first, second and third codes of a received information signal of a predetermined code format, and for enhancing the battery saving efficiency of the receiving unit, comprising the steps of: intermittently operating the receiving unit for a fixed short period of time at regular time interval by turning ON and OFF power supply to the receiving unit under control of a timing control circuit in the receiving unit, before the detection of the first code for indicating that information is being sent on a channel;

continuing the operation of the receiving unit for a fixed period of time, during which a just preceding one of the second codes is detected as a synchronizing code, after the detection of the first code;

intermittently receiving and detecting by the receiving unit a newly transmitted signal starting with the first code, by an intermittent power supply operation whereby the receiving unit is actuated in synchronism with the period of the second codes transmitted at regular intervals after the most preceding one of the second codes and for a period of time long enough to detect the first code and shorter than the time for detecting each second code, in the time intervals between the detection of the just preceding on of the second codes and the detection of the next one of the first codes;

intermittently received and detecting, at intervals determined by a self-identification memory in the receiving unit, the third code of information the position of which is determined between adjacent two of the second codes sent after the most preceding one of the second codes by a selective calling signal sent between the adjacent two of the second codes and assigned to the receiving unit; and utilizing the third code for deciding whether the receiving unit is synchronizing with the transmitted signal of the channel.

* * * * *